United States Patent
Kidd et al.

(10) Patent No.: US 12,455,605 B2
(45) Date of Patent: Oct. 28, 2025

(54) SERVER INFORMATION HANDLING SYSTEM WITH POWER INTERFACE COMPONENT

(71) Applicant: Dell Products L.P., Round Rock, TX (US)

(72) Inventors: Owen Kidd, Cedar Park, TX (US); Walter R. Carver, Round Rock, TX (US); Daniel Alvarado, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/138,760

(22) Filed: Apr. 25, 2023

(65) Prior Publication Data
US 2024/0361818 A1    Oct. 31, 2024

(51) Int. Cl.
*G06F 1/28*    (2006.01)
*G06F 13/40*    (2006.01)

(52) U.S. Cl.
CPC ............ *G06F 1/28* (2013.01); *G06F 13/4068* (2013.01)

(58) Field of Classification Search
CPC ................................ G06F 1/28; G06F 13/4068
USPC ......................................................... 713/300
See application file for complete search history.

(56) References Cited

U.S. PATENT DOCUMENTS

| | | | |
|---|---|---|---|
| 7,654,844 B1 * | 2/2010 | Wormsbecher | H05K 7/1492 439/259 |
| 11,449,112 B1 * | 9/2022 | Gao | H05K 7/1492 |
| 11,769,974 B1 * | 9/2023 | Signer | G06F 1/266 439/212 |
| 2004/0066954 A1 * | 4/2004 | Haruki | H05K 5/0273 382/115 |
| 2005/0174094 A1 * | 8/2005 | Purdy | H02J 7/00 320/134 |
| 2007/0025090 A1 * | 2/2007 | Belady | H05K 7/1492 361/724 |
| 2011/0029734 A1 * | 2/2011 | Pope | H04L 49/90 710/316 |
| 2013/0058028 A1 * | 3/2013 | Lu | G06F 1/181 361/679.31 |
| 2013/0194726 A1 * | 8/2013 | Bailey | H05K 7/1489 361/637 |
| 2014/0307375 A1 * | 10/2014 | Mann | H05K 7/1457 361/728 |
| 2016/0147590 A1 * | 5/2016 | Humphrey | G06F 11/0751 714/57 |
| 2016/0301323 A1 * | 10/2016 | Dilley | H02M 7/003 |
| 2018/0322082 A1 * | 11/2018 | Breakstone | G06T 1/20 |
| 2019/0059172 A1 * | 2/2019 | Gupta | G06F 1/187 |
| 2019/0288450 A1 * | 9/2019 | Brungard | H01R 13/2492 |
| 2021/0028710 A1 * | 1/2021 | Cao | H05K 7/20909 |
| 2021/0051814 A1 | 2/2021 | Carver et al. | |

(Continued)

Primary Examiner — Paul R. Myers
(74) Attorney, Agent, or Firm — Terrile, Cannatti & Chambers, LLP; Stephen A. Terrile

(57) ABSTRACT

A power interface component for a server type information handling system. The power interface component for a server type information handling system includes a power adapter structure, the power adapter structure converting a power supply based server type information handling system to function with a rack configured with a busbar power scheme, a portion of the power adapter structure being shaped to fit within a power supply unit bay of the server type information handling system.

12 Claims, 14 Drawing Sheets

(56) References Cited

U.S. PATENT DOCUMENTS

| | | | | |
|---|---|---|---|---|
| 2021/0343993 | A1* | 11/2021 | Yang | H02J 1/084 |
| 2022/0045463 | A1* | 2/2022 | Garton | H05K 7/1492 |
| 2022/0224286 | A1* | 7/2022 | Gao | H10N 10/10 |
| 2022/0283614 | A1* | 9/2022 | Gao | G06F 1/189 |
| 2022/0283615 | A1* | 9/2022 | Gao | G06F 1/189 |
| 2022/0360188 | A1* | 11/2022 | Berg-Palmqvist | H05K 7/14329 |
| 2023/0056298 | A1* | 2/2023 | Gao | H05K 7/20772 |
| 2023/0170793 | A1* | 6/2023 | Chen | H02J 1/102 363/13 |
| 2023/0240037 | A1* | 7/2023 | Tsorng | H05K 7/1489 361/679.01 |
| 2024/0126355 | A1* | 4/2024 | Krishnapura | G06F 1/28 |

* cited by examiner

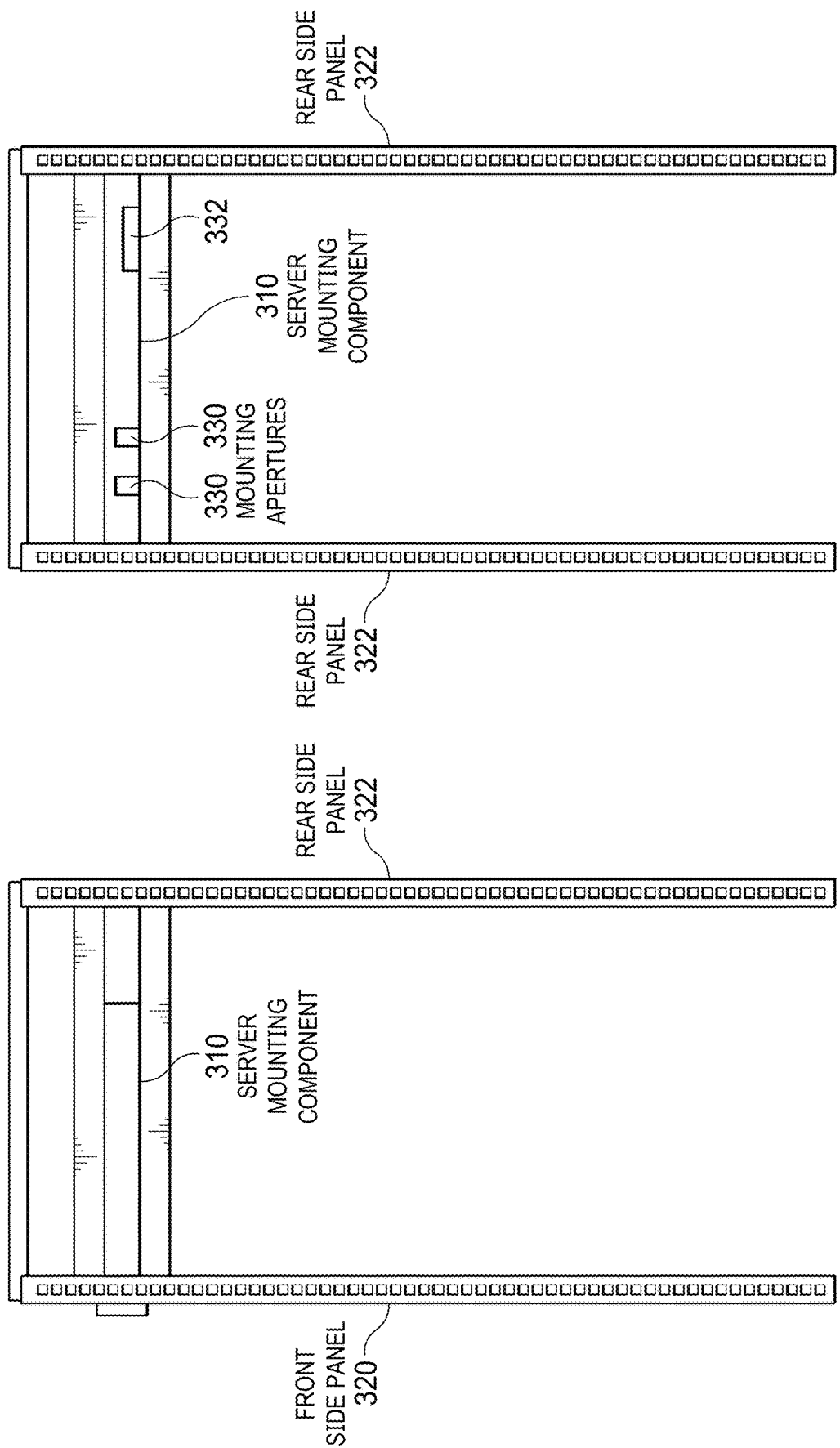

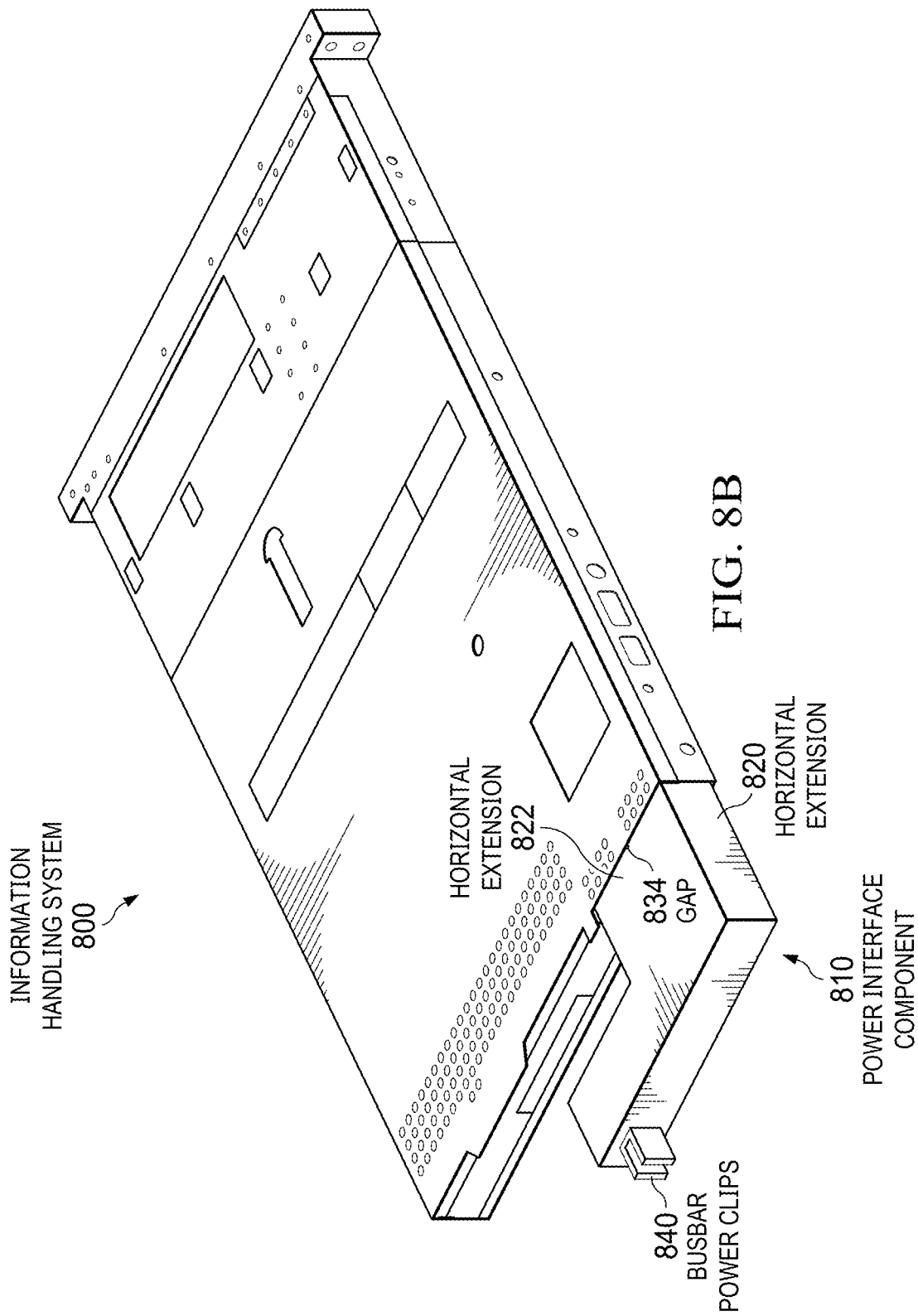

SERVER INFORMATION HANDLING SYSTEM WITH POWER INTERFACE COMPONENT

BACKGROUND OF THE INVENTION

Field of the Invention

The present invention relates to information handling systems. More specifically, embodiments of the invention relate to server type information handling systems within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers.

SUMMARY OF THE INVENTION

A system and method for enabling conversion of existing rack server solutions into busbar compatible server systems. In certain embodiments, the system and method include provision of a flexible power interface component which enables conversion of existing rack server solutions into busbar compatible server systems.

In one embodiment, the invention relates to a power interface component for a server type information handling system, comprising: a power adapter structure, the power adapter structure converting a power supply based server type information handling system to function with a rack configured with a busbar power scheme, a portion of the power adapter structure being shaped to fit within a power supply unit bay of the server type information handling system.

In another embodiment, the invention relates to a system comprising: a processor; a data bus coupled to the processor; a server housing, the server housing defining a power supply unit bay; and, a power interface component, the power interface component comprising a power adapter structure, the power adapter structure converting a power supply based server type information handling system to function with a rack configured with a busbar power scheme, a portion of the power adapter structure being shaped to fit within the power supply unit bay of the server type information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3A, 3B and 3C show a rack front view, a rack side view, and a rack side view with an information handling system in an accessible position.

FIGS. 8A and 8B, generally referred to as FIG. 8, show perspective views of a rack server type information handling system with an alternate power interface component.

DETAILED DESCRIPTION

Figure 1:
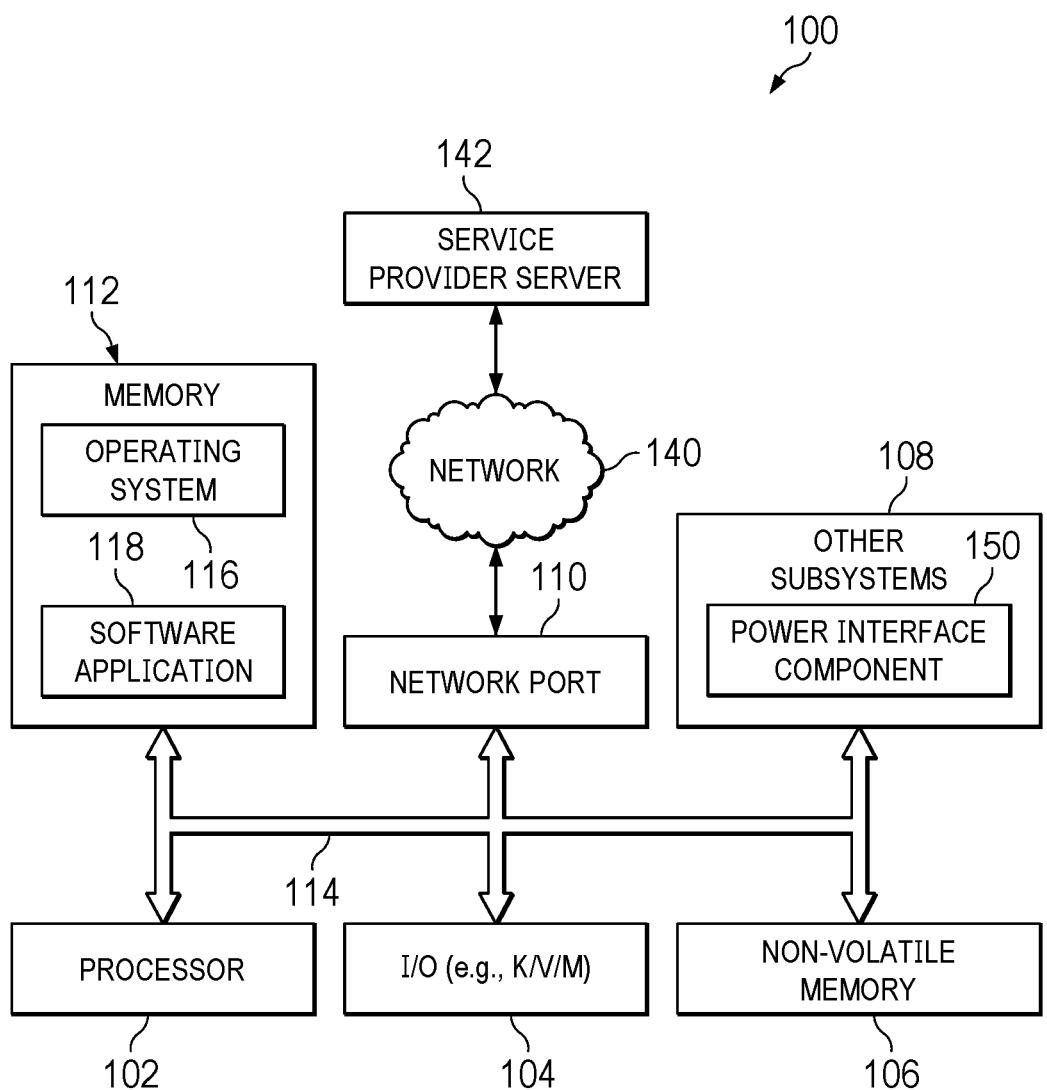
FIG. 1 shows a general illustration of components of an information handling system as implemented in the system and method of the present invention.

Various aspects of the disclosure include an appreciation that certain standards for data center rack busbar based power schemes (such as open compute project open rack standard) can require unique connection mechanisms to provide power to rack server type information handling systems. Various aspects of the disclosure include an appreciation that a busbar based power scheme often does not work well with a server portfolio strategy which makes use of modular power supply design. Various aspects of the disclosure include an appreciation that it would be desirable to enable conversion of existing rack server solutions into busbar compatible server systems.

A system and method are disclosed for enabling conversion of existing rack server solutions into busbar compatible server systems. In certain embodiments, the system and method include provision of a flexible power interface component which enables conversion of existing rack server solutions into busbar compatible server systems. In certain embodiments, the flexible power interface component includes a power adapter structure which includes voltage conversion circuitry. In various embodiments, because the busbar power scheme may differ in rear-of-rack location between various rack implementations (e.g., one vendor may be biased left, one vendor may be biased right, one vendor may be configured with a horizontal structure which needs clip to the left for airflow for example), the system and method include provision of a flexible power interface component which allows flexibility of existing busbar compatible platforms to adjust to various busbar positioning. Such an adjustable flexible power interface component reduces a proliferation of custom SKU parts while functioning with a plurality of rear-of-rack locations.

In certain embodiments, the flexible power interface component includes a structure shaped to fit across the rear of a rack mount server and into two or more power supply unit (PSU) bays. In certain embodiments, some or all of the structure is composed of metal. In certain embodiments, the structure of the flexible power interface component defines an internal void. In certain embodiments, the structure includes one or more busbar power clips on its rear face. In certain embodiments, the internal void houses electronic circuitry for converting various input voltages to server-compatible values. In certain embodiments, the electronic circuitry of the flexible power interface component includes interfaces to the server power supply sockets. In certain embodiments, each segment of the structure which docks into the server PSU bays include respective interfaces to the server power supply sockets. In certain embodiments, the structure covers rear I/O ports of the server to provide additional security for unused connections or acts as a replacement faceplate for certain rear port locations.

In certain embodiments, the flexible power interface component embodiment includes a horizontal open space across the rear of the interface component which becomes a new rear face of a server chassis by covering the existing rear of the chassis. In certain embodiments, the open space spans across a substantial portion of the width of the server chassis (e.g., 60-80% of the width of the server chassis). In certain embodiments, the open space is substantially (e.g., +/−20%) as tall as the busbar power clip of the power interface component. In certain embodiments, the power interface component includes a fastening mechanism to secure a busbar power clip into a position along the length of the horizontal open space. In certain embodiments, the fastening mechanism is located above the horizontal open space, below the horizontal open space or a combination thereof. In certain embodiments, the busbar power clip is positioned in specific locations along the horizontal open space or anywhere along the length of the server rear depending on design requirements. In certain embodiments, the busbar power clip is positioned in one of three specific locations defined by a standard for data center rack busbar based power schemes.

Such a power interface component provides a self-contained method to adapt existing portfolio products into busbar compatible systems for (cold aisle) front I/O applications. Such a power interface component adapts to the challenge differently than rail-mounted blind-mate adapters and custom designed server rear ends. Such a power interface component also allows adjustability of rear busbar power clip, where most implementations use fixed rear power clip locations such as those defined by the OCP open rack standard specification.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116. In certain embodiments, the information handling system 100 is one of a plurality of information handling systems within a data center. In certain embodiments, the information handling system 100 comprises a server type information handling system. In certain embodiments, the server type information handling system is configured to be mounted within a server rack. In certain embodiments, the other subsystem 108 includes one or more power supplies for supplying power to the other components of the information handling system 100.

In certain embodiments, the information handling system 100 comprises a server type information handling system. In certain embodiments, the server type information handling system comprises a rack server type information handling system. As used herein, a rack server type information handling system broadly refers to an information handling system which is physically configured to be mounted within a server rack.

In certain embodiments, the information handling system 100 includes a power interface component 150. In certain embodiments, the power interface component 150 interacts with a rack power source to provide the functionality of one or more power supplies to the information handling system. In certain embodiments, the power interface component 150 enables conversion of existing rack server solutions into busbar compatible server systems. In certain embodiments, the power interface component 150 includes a power adapter structure which includes voltage conversion circuitry. In various embodiments, because the busbar power scheme may differ in rear-of-rack location between various rack implementations, the power interface component 150 includes provision of a flexible power interface component which allows flexibility of existing busbar compatible platforms to adjust to various busbar positioning. Such a power interface component 150 reduces a proliferation of custom SKU parts while functioning with a plurality of rear-of-rack locations.

In certain embodiments, the power interface component 150 includes a structure shaped to fit across the rear of a rack mount server and into two or more power supply unit (PSU) bays. In certain embodiments, some or all of the structure is composed of metal. In certain embodiments, the structure of the flexible power interface component defines an internal void. In certain embodiments, the structure includes one or more busbar power clips on its rear face. In certain embodiments, the internal void houses electronic circuitry for converting various input voltages to server-compatible values. In certain embodiments, the electronic circuitry of the power interface component 150 includes interfaces to the server power supply sockets. In certain embodiments, each segment of the structure which docks into the server PSU bays include respective interfaces to the server power supply sockets. In certain embodiments, the structure covers rear I/O ports of the server to provide additional security for unused connections or acts as a replacement faceplate for certain rear port locations.

In certain embodiments, the power interface component 150 embodiment includes a horizontal open space across the rear of the interface component which becomes a new rear face of a server chassis by covering the existing rear of the server chassis. In certain embodiments, the open space spans across a substantial portion of the width of the server chassis (e.g., 60-80% of the width of the server chassis). In certain embodiments, the open space is substantially (e.g., +/−20%) as tall as the busbar power clip of the power interface component. In certain embodiments, the power interface component includes a fastening mechanism to secure a busbar power clip into a position along the length of the horizontal open space. In certain embodiments, the fastening mechanism is located above the horizontal open space, below the horizontal open space or a combination thereof. In certain embodiments, the busbar power clip is positioned in specific locations along the horizontal open space or anywhere along the length of the server rear depending on design requirements. In certain embodiments, the busbar power clip is positioned in one of three specific locations defined by a standard for data center rack busbar based power schemes.

Such a power interface component 150 provides a self-contained device to adapt existing portfolio products into busbar compatible systems for (cold aisle) front I/O applications. Such a power interface component 150 adapts to the challenge differently than rail-mounted blind-mate adapters and custom designed server rear ends. Such a power interface component also allows adjustability of rear busbar power clip, where most implementations use fixed rear power clip locations such as those defined by the OCP open rack standard specification.

Figure 2:
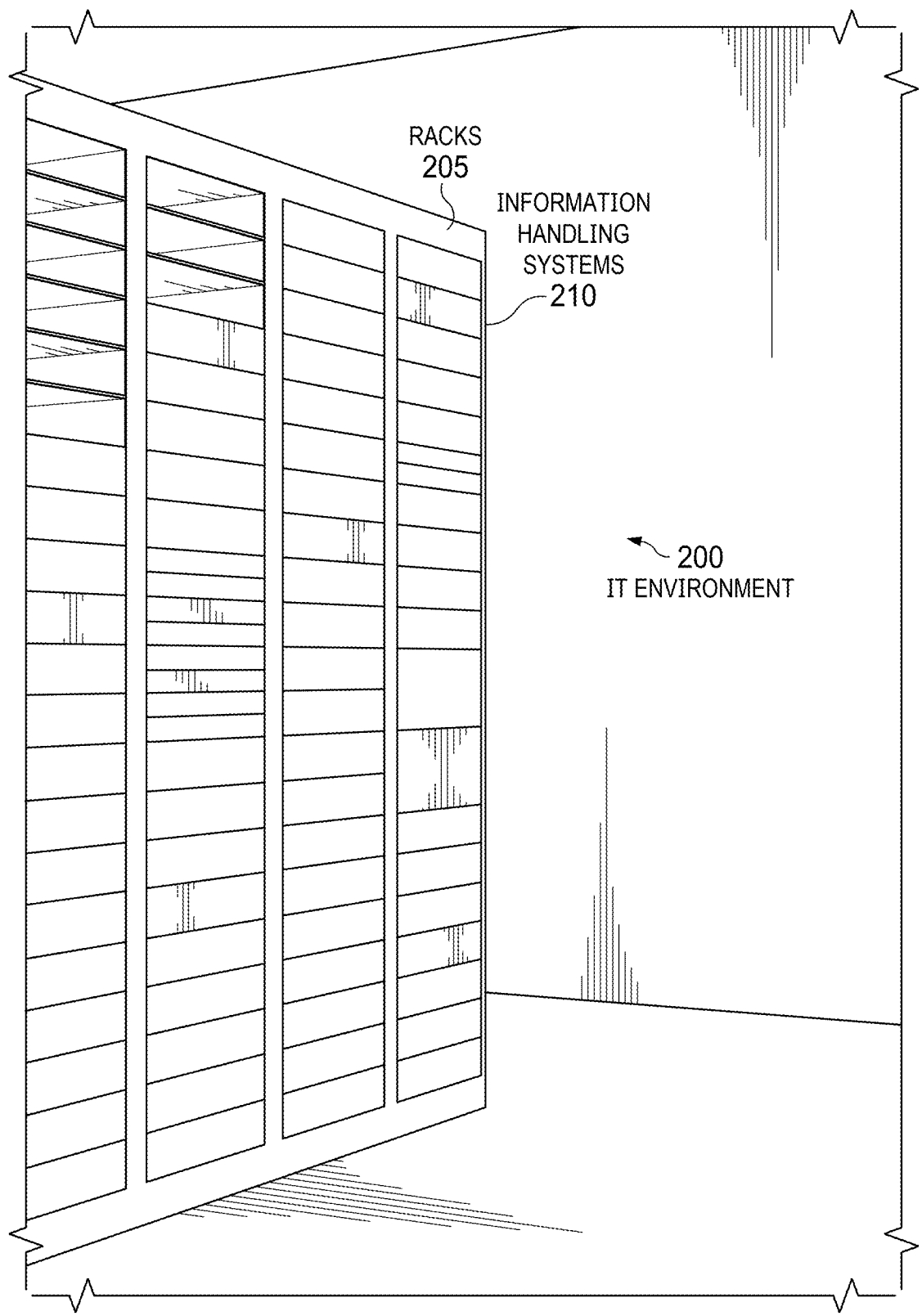
FIG. 2 shows a perspective view of a portion of a data center within an IT environment.

FIG. 2 shows a perspective view of a portion of an IT environment 200. The IT environment includes one or more racks 205 which include a plurality of information handling systems 100, often referred to as a server rack. In various embodiments, the IT environment 200 comprises a data center. As used herein, a data center refers to an IT environment which includes a plurality of networked information handling systems 100. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective racks. As used herein, a rack refers to a physical structure that is designed to house the information handling systems 100 as well as the associated cabling and power provision for the information handling systems. In certain embodiments, a rack includes side panels to which the information handling systems are mounted. In certain embodiments, the rack includes a top panel and a bottom panel to which the side panels are attached. In certain embodiments, the side panels each include a front side panel and a rear side panel.

In certain embodiments, a plurality of racks is arranged continuous with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

Each respective rack includes a plurality of vertically arranged information handling systems 210. In certain embodiments, the information handling systems may conform to one of a plurality of standard server sizes. In certain embodiments, the plurality of server sizes conforms to particular rack unit sizes (i.e., rack units). As used herein, a rack unit broadly refers to a standardized server system height. As is known in the art, a server system height often conforms to one of a 1 U rack unit, a 2 U rack unit and a 4 U rack unit. In general, a 1 U rack unit is substantially (i.e., +/−20%) 1.75" high, a 2 U rack unit is substantially (i.e., +/−20%) 3.5" high and a 4 U rack height is substantially (i.e., +/−20%) 7.0" high. In certain embodiments, the plurality of service sizes includes open rack (OU) server sizes. As used herein, an open rack server size broadly refers to a standardized server system height conforming to an Open-Rack standard.

Figure 3A:
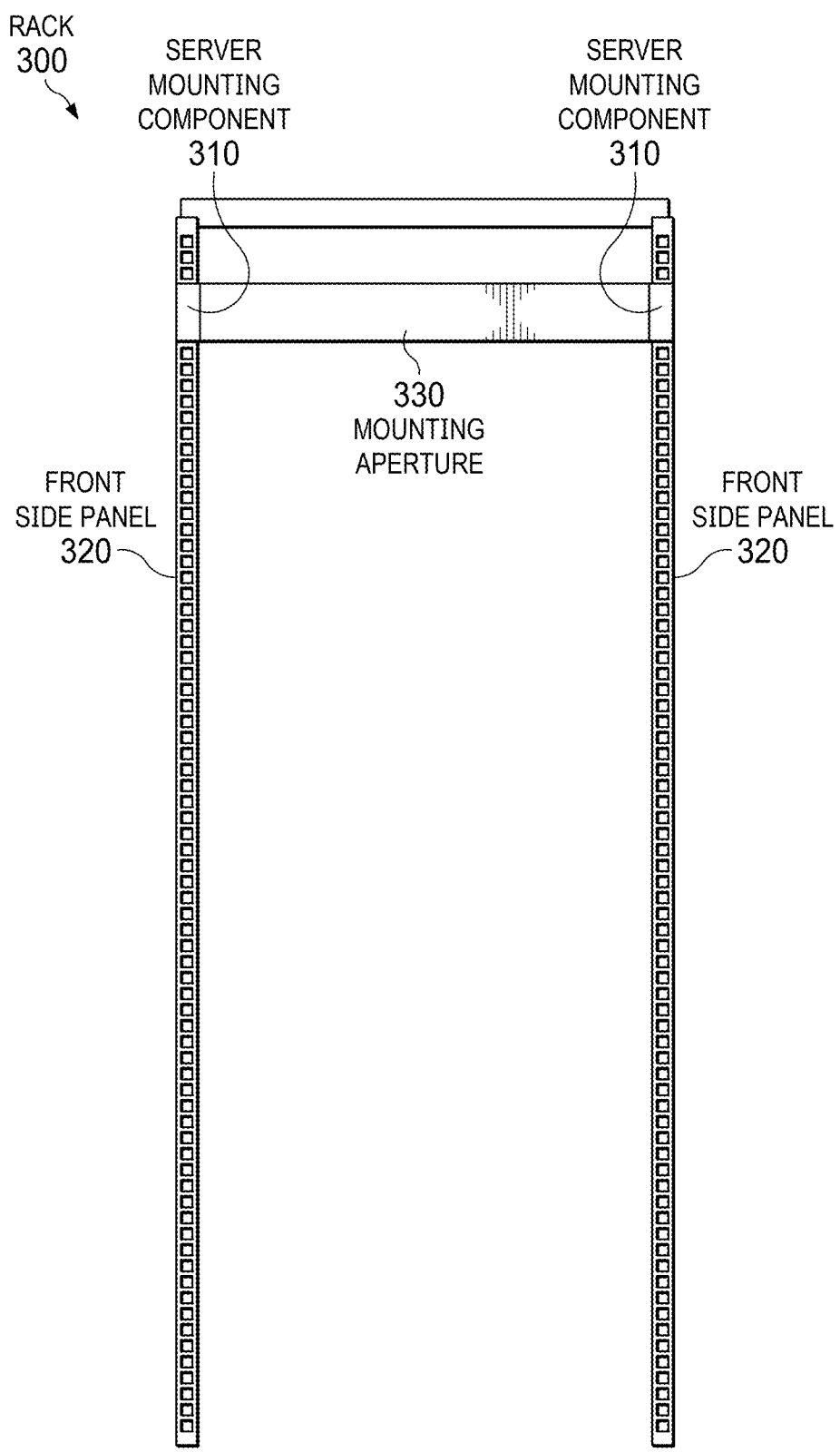

FIGS. 3A, 3B and 3C show a rack front view, a rack side view, and a rack rear view with an information handling system. A first server mounting component 310 is attached to one side of the rack and a second server mounting component 310 is attached to another side of the rack 300. In certain embodiments, the first server mounting component is attached to a first front side panel 320 and a first rear side panel 322 of the rack 300. In certain embodiments, the second server mounting component is attached to a second front side panel 320 and a second rear side panel 322 of the rack 300. In certain embodiments, the first server mounting component 320 is attached via the mounting apertures 330, 332. In certain embodiments, the second server mounting component is attached via the mounting apertures 330, 332.

In certain embodiments, a rack includes a plurality of vertically arranged mounting components. In certain embodiments, some or all of the vertically arranged mounting components are adapted to mount respective rack server type information handling systems to the rack. In certain embodiments, the server mounting components are configured to correspond to particular heights including rack unit heights and open unit heights.

Figure 4:
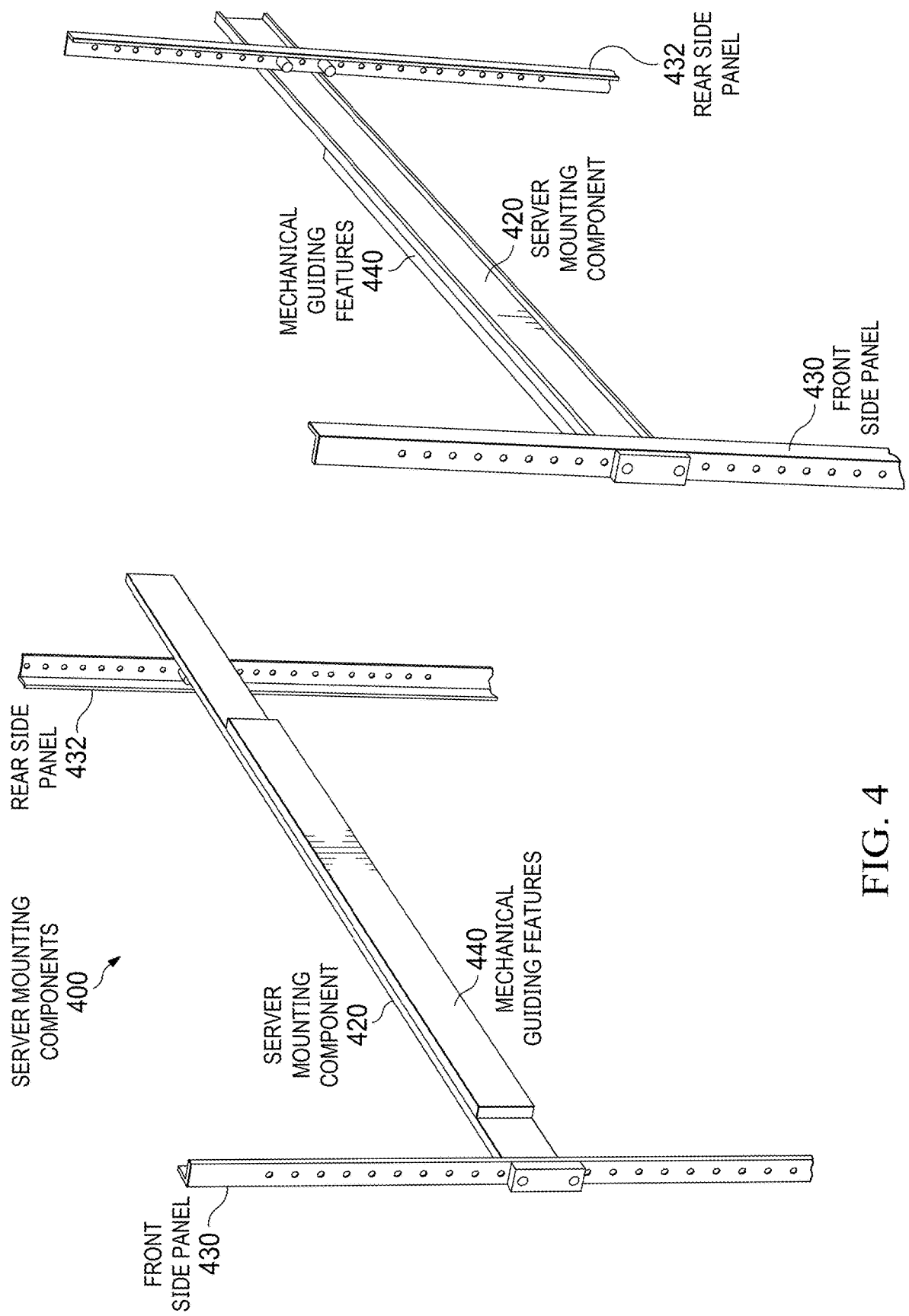
FIG. 4 shows a perspective view of server mounting components attached to a rack.

FIG. 4 shows a perspective view of server mounting components 400 attached to a rack. In certain embodiments, a first server mounting component 420 is attached to one side of the rack and a second server mounting component 420 is attached to another side of the rack 410. In certain embodiments, the first server mounting component is attached to a first front side panel 430 and a first rear side panel 432 of the rack. In certain embodiments, the second server mounting component is attached to a second front side panel 430 and a second rear side panel 432 of the rack. In certain embodiments, the server mounting components 400 include one or more mechanical guiding features 440 mechanically coupled to respective server mounting components 420.

Figure 5:
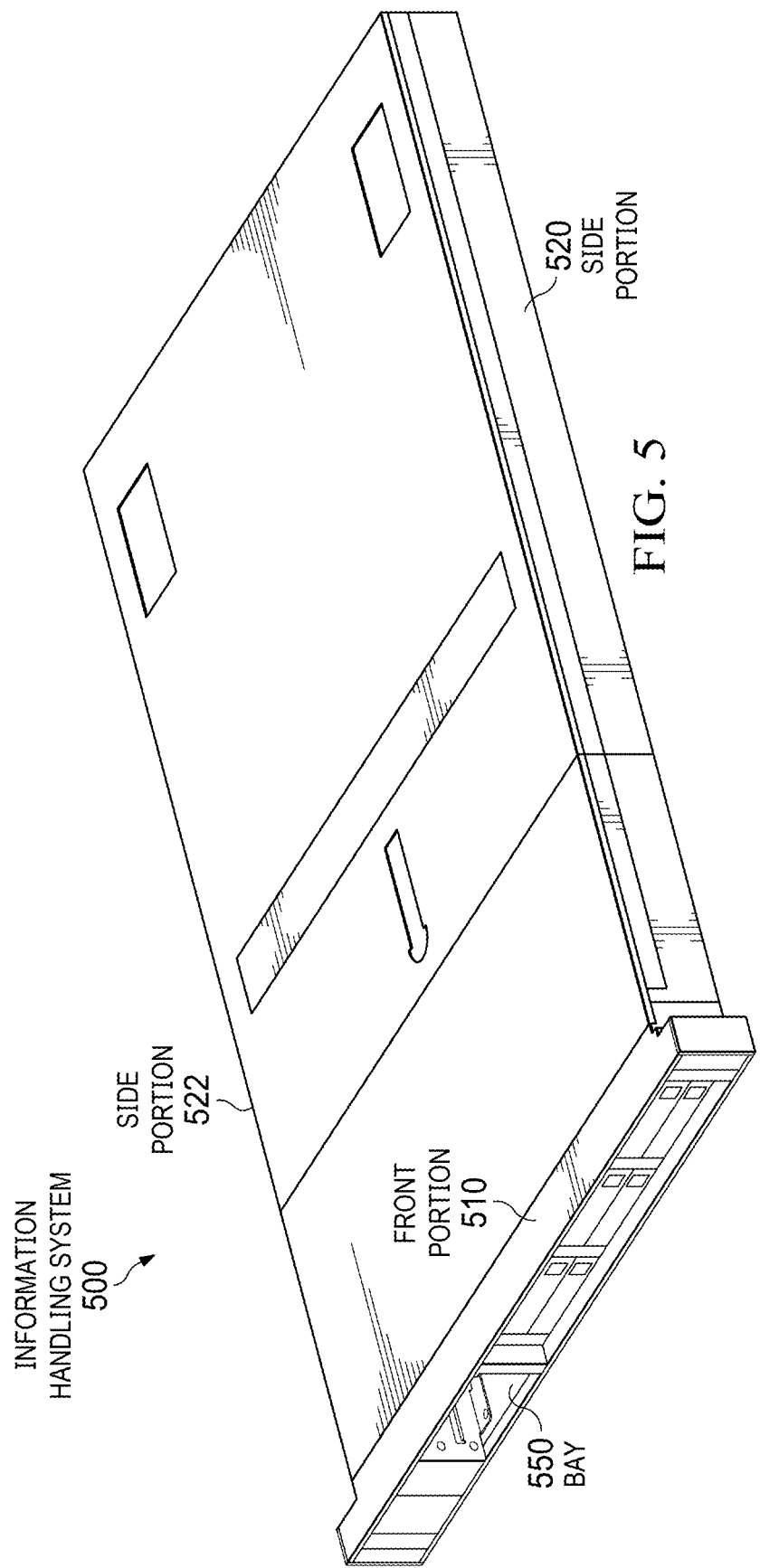
FIG. 5 shows a generalized perspective view of an example rack server type information handling system.

FIG. 5 shows a generalized perspective view of an example rack server type information handling system 500. In certain embodiments, the rack server type information handling system includes a front portion 510, which is accessible when the rack server type information handling system 500 is mounted on a server rack. In certain embodiments, the side portions 520, 522 mount to the rack via respective server mounting components. In certain embodiments, the side portions mount to the rack via respective mechanical guiding features which are mechanically coupled to respective server mounting components. In certain embodiments, the rack server type information handling system can slide out from the rack via the respective mechanical guiding features. In certain embodiments, the rack type information handing system 500 includes a bay 550 via which components may be mounted to the rack type information handling system.

Figure 6A:
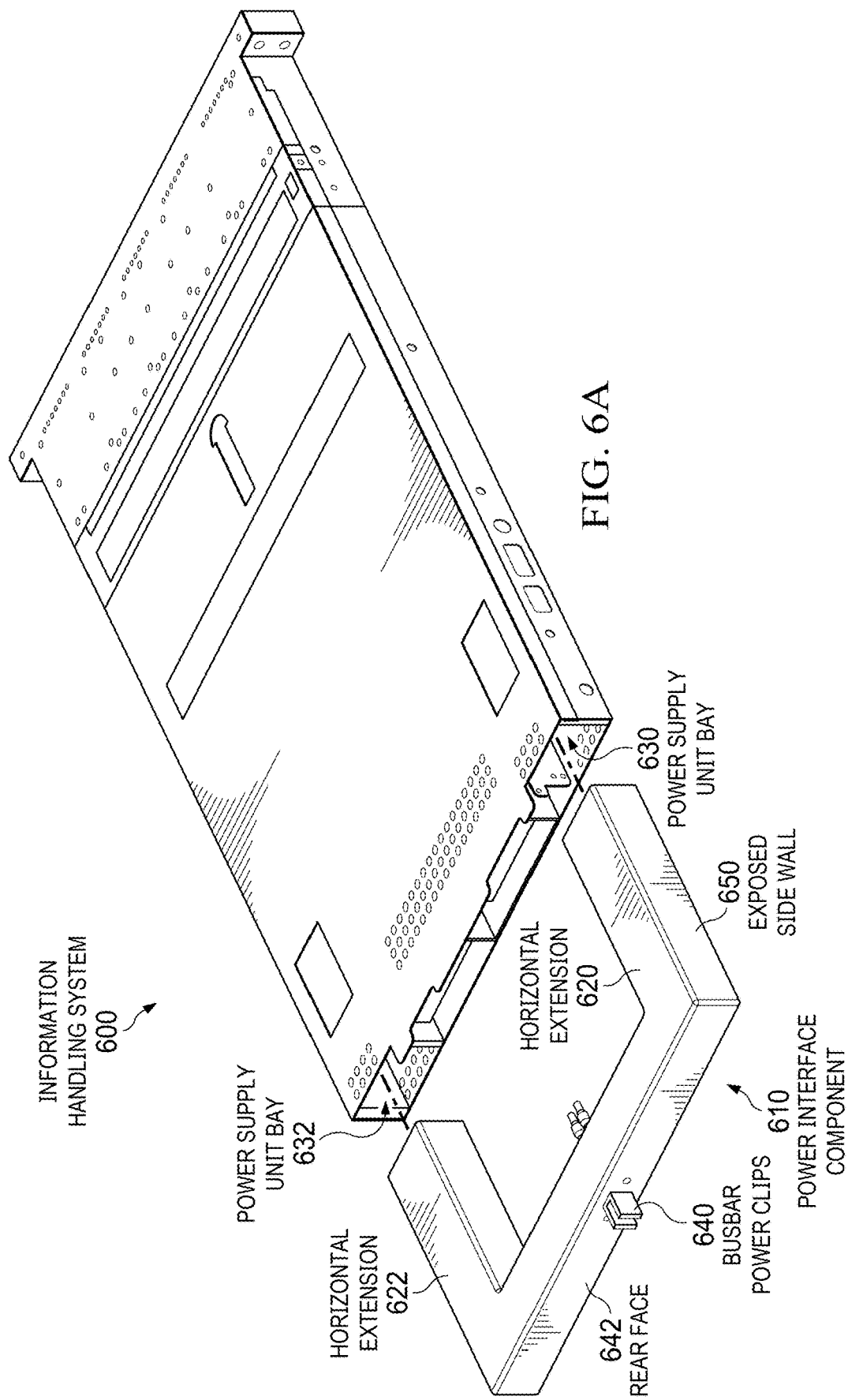
FIGS. 6A and 6B, generally referred to as FIG. 6, show perspective views of a rack server type information handling system with power interface component.
Figure 6B:
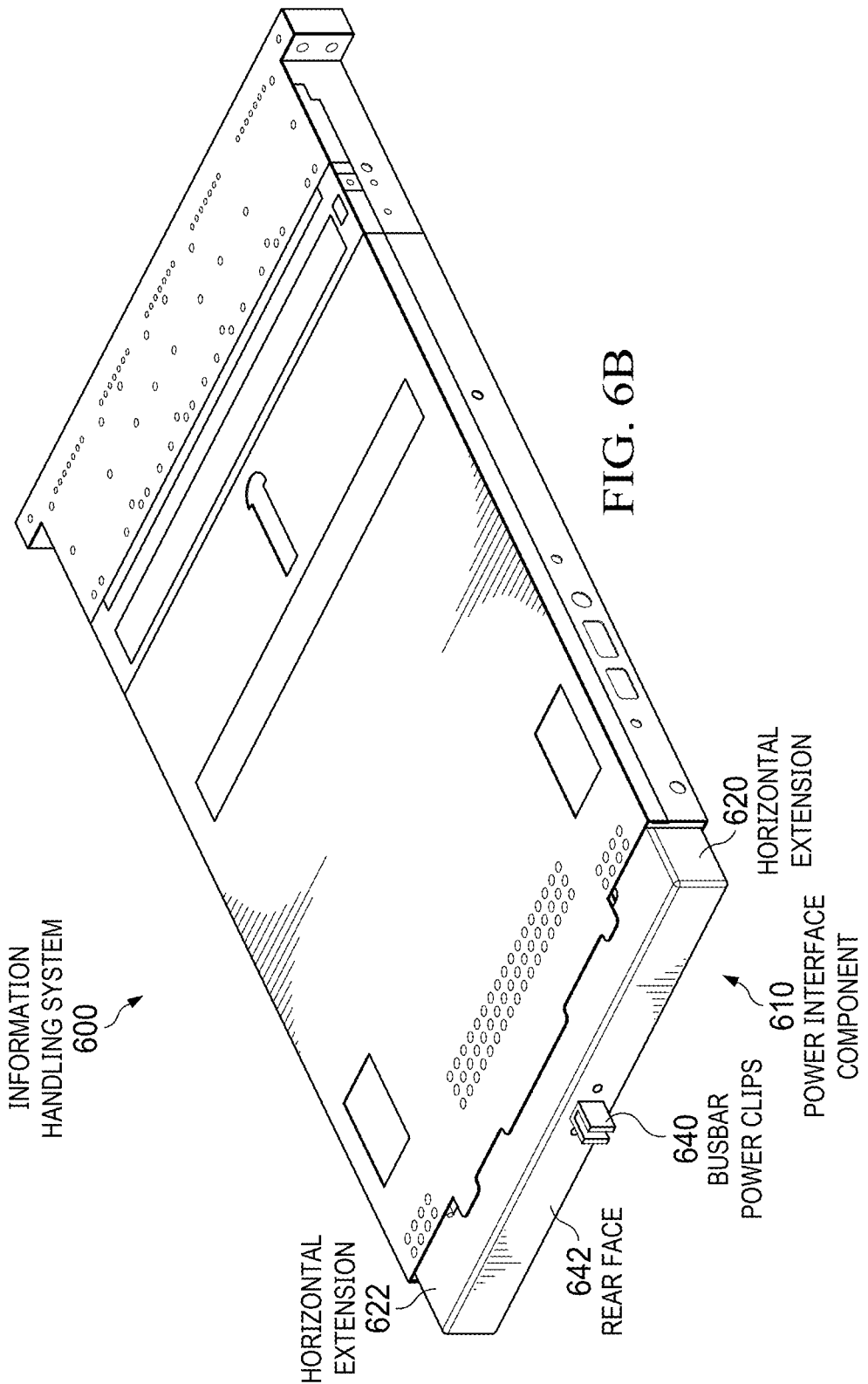
Figure 7:
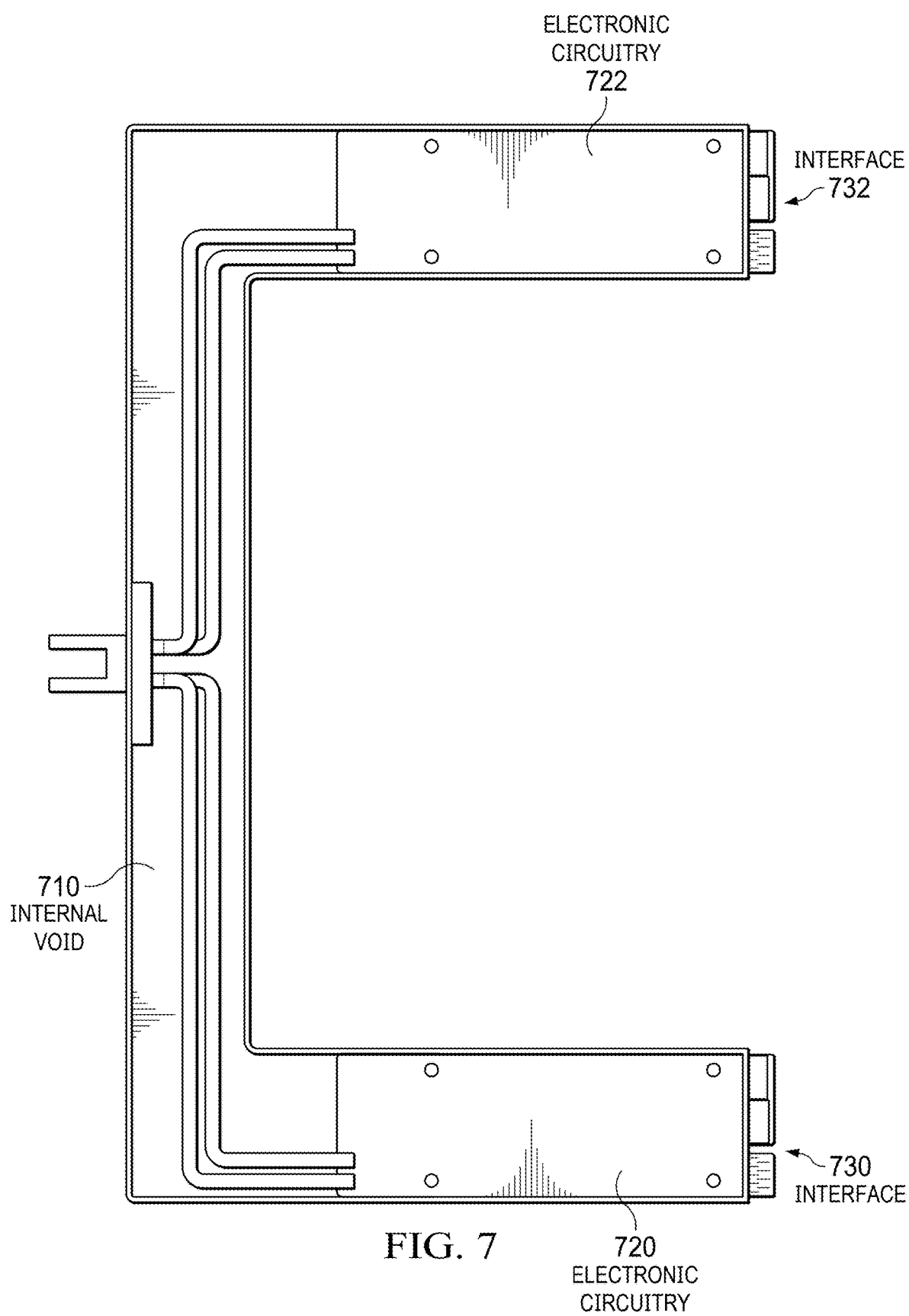
FIG. 7 shows a cut away top view of a power interface component.

FIGS. 6A and 6B, generally referred to as FIG. 6, show perspective views of a rack server type information handling system 600 with a power interface component 610. FIG. 7 shows a cut away top view of a power interface component 610.

In certain embodiments, the information handling system 100 includes a power interface component 610. In certain embodiments, the power interface component 610 interacts with a rack power source to provide the functionality of one or more power supplies to the information handling system. In certain embodiments, the power interface component 610 enables conversion of existing rack server solutions into busbar compatible server systems. In certain embodiments, the power interface component 610 includes a power adapter structure which includes voltage conversion circuitry. In various embodiments, because the busbar power scheme may differ in rear-of-rack location between various rack implementations, the power interface component 610 includes provision of a flexible power interface component which allows flexibility of existing busbar compatible platforms to adjust to various busbar positioning. Such a power interface component 610 reduces a proliferation of custom SKU parts while functioning with a plurality of rear-of-rack locations.

In certain embodiments, the power interface component 610 includes a U shaped structure shaped to fit across the rear of a rack mount server and into two or more power supply unit (PSU) bays located along outside edges of the server type information handling system. In certain embodiments, some or all of the structure is composed of metal. In certain embodiments, horizontal extensions 620, 622 fit into respective power supply unit bays 630, 632 of the server type information handling system. In certain embodiments, when the structure is inserted into the respective power supply unit bays, the dimensions of the combination of the sever type information handling system 600 and the power interface component 610 conform to dimensions defined by a standard for data center rack busbar based power schemes. In certain embodiments, the exposed side wall 650 of the structure 610 adds to the total depth of the structure and the information handing system 600 to provide a depth which conforms to a depth dimension defined by a standard for data center rack busbar based power schemes.

In certain embodiments, the structure of the flexible power interface component defines an internal void 710. In certain embodiments, the structure includes one or more busbar power clips 640 on its rear face 642. In certain embodiments, the internal void 710 houses electronic circuitry 720, 722 for converting various input voltages received via the busbar power clips 640 to server-compatible values. In certain embodiments, the electronic circuitry of the power interface component 610 includes interfaces 730, 732 to respective server power supply sockets. In certain embodiments, the interfaces 730, 732 are configured to couple with power supply respective receiving interfaces of the server type information handling system 600. In certain embodiments, each segment of the structure which docks into the server PSU bays include respective interfaces 730, 732 to the server power supply sockets. In certain embodiments, the structure 610 covers rear I/O ports of the server to provide additional security for unused connections or acts as a replacement faceplate for certain rear port locations.

Such a power interface component 610 provides a self-contained device to adapt existing portfolio products into busbar compatible systems for (cold aisle) front I/O applications. Such a power interface component 610 adapts to the challenge differently than rail-mounted blind-mate adapters and custom designed server rear ends. Such a power interface component also allows adjustability of rear busbar power clip, where most implementations use fixed rear power clip locations such as those defined by the OCP open rack standard specification.

Figure 8A:
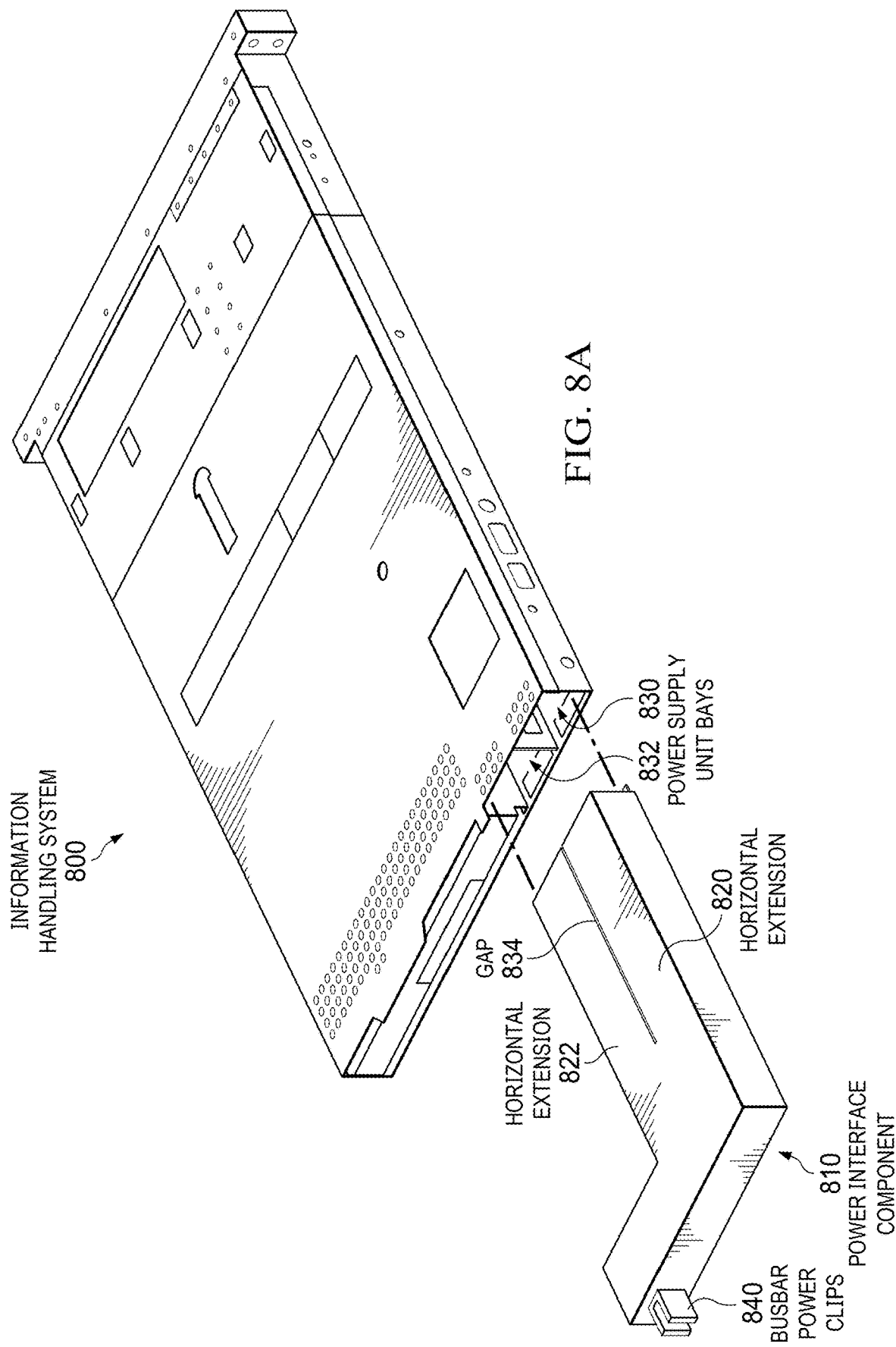
Figure 9:
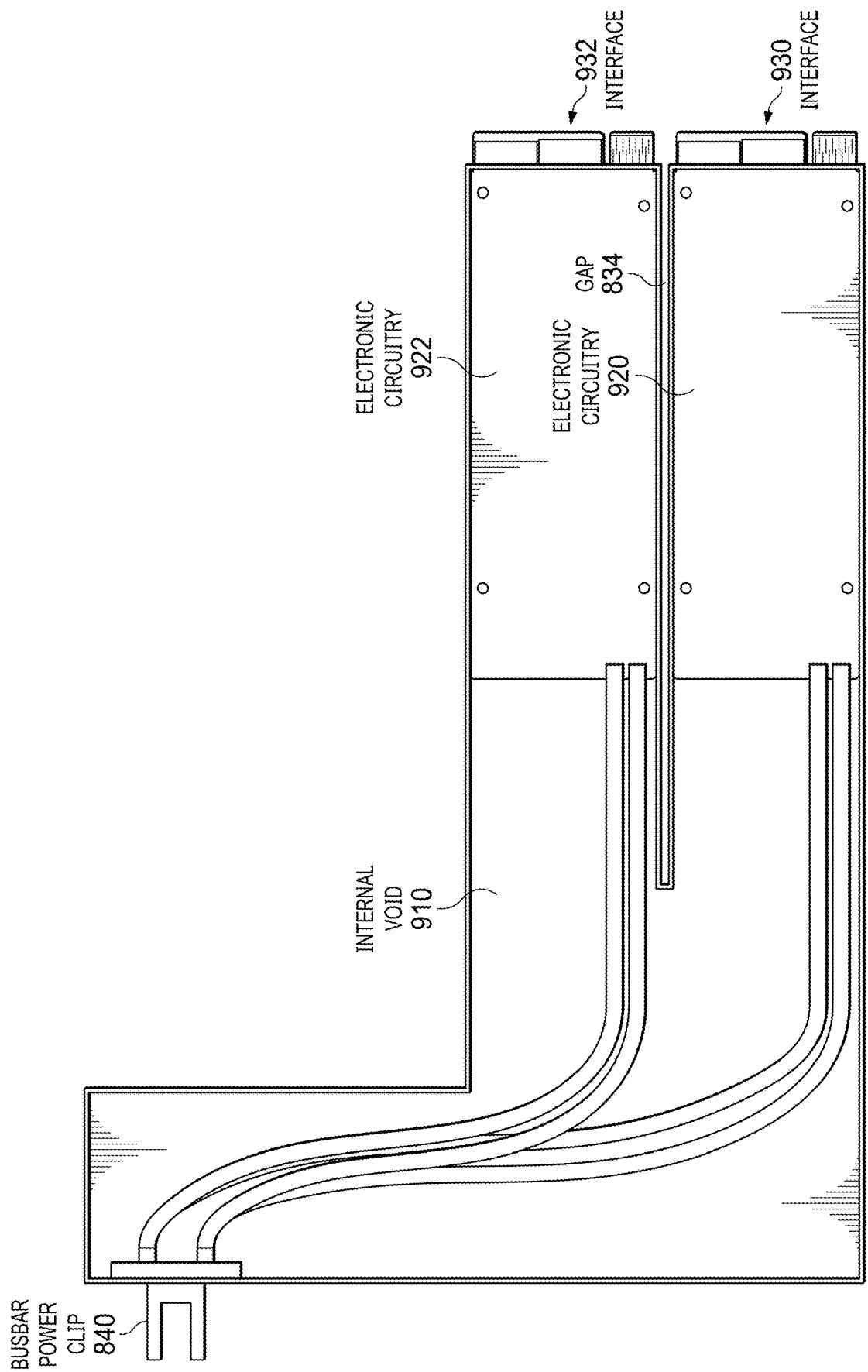
FIG. 9 shows a cut away top view of an alternate power interface component.

FIGS. 8A and 8B, generally referred to as FIG. 8, show perspective views of a rack server type information handling system with an alternate power interface component. FIG. 9 shows a cut away top view of an alternate power interface component.

In certain embodiments, the information handling system 100 includes a power interface component 810. In certain embodiments, the power interface component 810 interacts with a rack power source to provide the functionality of one or more power supplies to the information handling system. In certain embodiments, the power interface component 810 enables conversion of existing rack server solutions into busbar compatible server systems. In certain embodiments, the power interface component 810 includes a power adapter structure which includes voltage conversion circuitry. In various embodiments, because the busbar power scheme may differ in rear-of-rack location between various rack implementations, the power interface component 810 includes provision of a flexible power interface component which allows flexibility of existing busbar compatible platforms to adjust to various busbar positioning. Such a power interface component 810 reduces a proliferation of custom SKU parts while functioning with a plurality of rear-of-rack locations.

In certain embodiments, the power interface component 810 includes an L shaped structure shaped to fit across a portion of the rear of a rack mount server and into two or more power supply unit (PSU) bays located along an edge of the server type information handling system. In certain embodiments, some or all of the structure is composed of metal. In certain embodiments, horizontal extensions 820, 822 fit into respective power supply unit bays 830, 832 of the server type information handling system. In certain embodiments, when the structure is inserted into the respective power supply unit bays, the dimensions of the combination of the sever type information handling system 800 and the power interface component 810 conform to dimensions defined by a standard for data center rack busbar based power schemes. In certain embodiments, the exposed side wall 820 of the structure combines with the information handing system 800 to provide a depth which conforms to a depth dimension defined by a standard for data center rack busbar based power schemes.

In certain embodiments, the horizontal extensions 820, 822 are separated by a gap 834 defined by the structure. In certain embodiments, the gap 834 allows the power interface component 810 to be inserted into the pair of power supply unit bays 830, 832 of the server type information handling system 800. In certain embodiments, the structure of the flexible power interface component defines an internal void 910. In certain embodiments, the structure includes one or more busbar power clips 840 on its rear face 842. In certain embodiments, the internal void 910 houses electronic circuitry 920, 922 for converting various input voltages received via the busbar power clip 840 to server-compatible values. In certain embodiments, the electronic circuitry of the power interface component 810 includes interfaces 930, 932 to respective server power supply sockets. In certain embodiments, the interfaces 930, 932 are configured to couple with power supply respective receiving interfaces of the server type information handling system 800. In certain embodiments, each segment of the structure which docks into the server PSU bays include respective interfaces 930, 932 to the server power supply sockets. In certain embodiments, the structure covers rear I/O ports of the server to provide additional security for unused connections or acts as a replacement faceplate for certain rear port locations.

Such a power interface component 810 provides a self-contained device to adapt existing portfolio products into busbar compatible systems for (cold aisle) front I/O applications. Such a power interface component 810 adapts to the challenge differently than rail-mounted blind-mate adapters and custom designed server rear ends. Such a power interface component also allows adjustability of rear busbar power clip, where most implementations use fixed rear power clip locations such as those defined by the OCP open rack standard specification.

Figure 10:
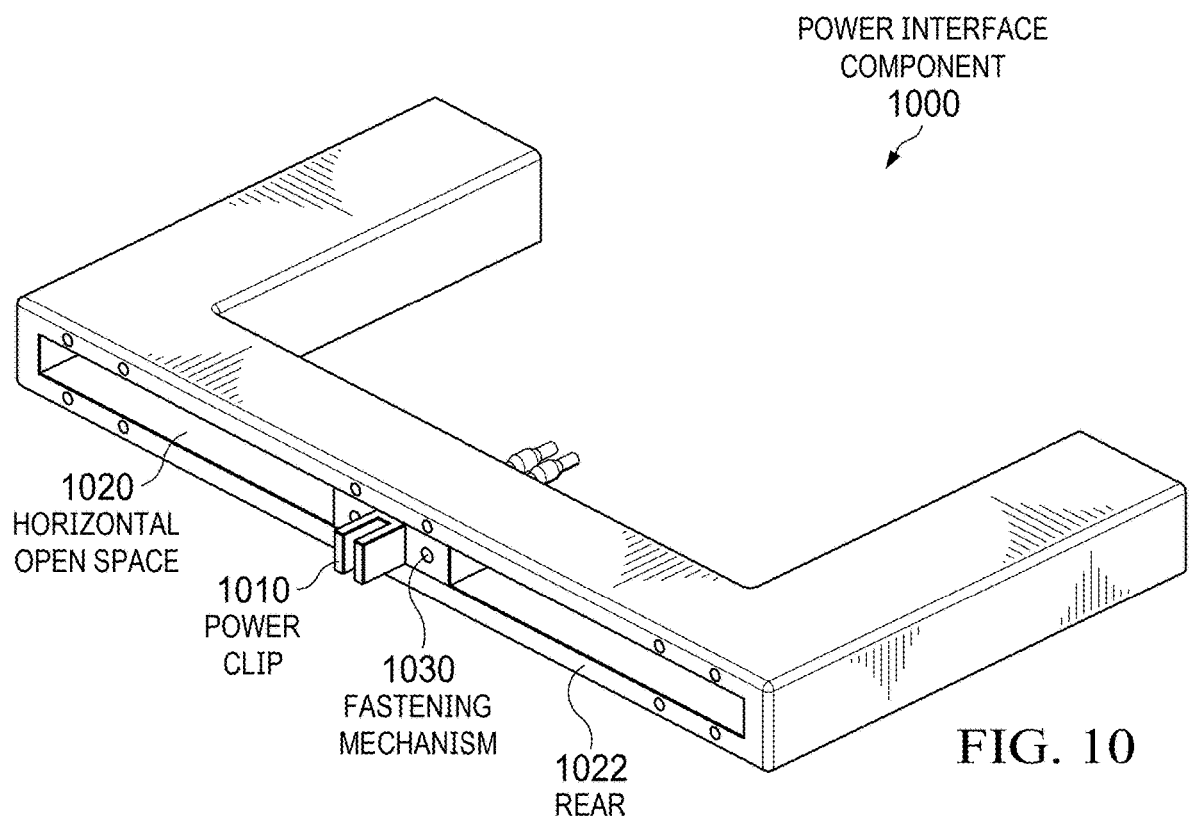
FIG. 10 is a perspective view of a power interface component having an adjustable power clip position.

FIG. 10 shows a perspective view of a power interface component 1000 having a power clip 1010 which is adjustable. In certain embodiments, the power interface component 1000 includes a horizontal open space 1020 across the rear 1022 of the interface component which becomes the rear of a server chassis. In certain embodiments, the open space 1020 spans across a substantial portion of the width of the server chassis (e.g., 60-80% of the width of the server chassis). In certain embodiments, the open space 1020 is substantially (e.g., up to 20% larger) as tall as the busbar power 1010 clip of the power interface component.

In certain embodiments, the power interface component 1000 includes a fastening mechanism 1030 to secure the busbar power clip 1010 into a position along the length of the horizontal open space. In certain embodiments, the fastening mechanism 1030 is located above the horizontal open space, below the horizontal open space or a combination thereof. In certain embodiments, the busbar power clip is positioned in specific locations along the horizontal open space or anywhere along the length of the server rear depending on design requirements. In certain embodiments, the specific locations include respective attachment portions to secure the busbar clip to the specific location. In certain embodiments, the busbar power clip is positioned in one of three specific locations defined by a standard for data center rack busbar based power schemes.

Figure 11:
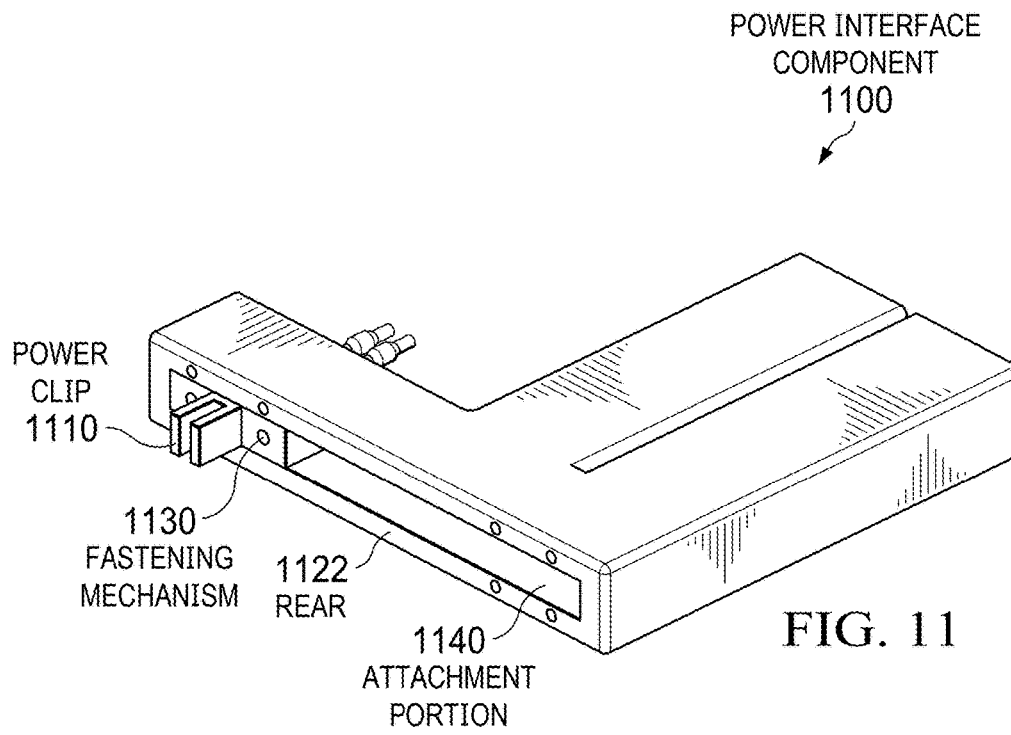
FIG. 11 is a perspective view of an alternate power interface component having an adjustable power clip position.

FIG. 11 shows a perspective view of an alternate power interface component 1100 having a power clip 1110 which is adjustable. In certain embodiments, the power interface component 1100 includes a horizontal open space 1120 across the rear 1122 of the interface component which becomes the rear of a server chassis. In certain embodiments, the open space 1120 spans across a substantially half the width of the server chassis (e.g., 60-80% of half the width of the server chassis). In certain embodiments, the open space 1120 is substantially (e.g., +/−20%) as tall as the busbar power 1110 clip of the power interface component.

In certain embodiments, the power interface component 1100 includes a fastening mechanism 1130 to secure the busbar power clip 1110 into a position along the length of the horizontal open space. In certain embodiments, the fastening mechanism 1130 is located above the horizontal open space, below the horizontal open space or a combination thereof. In certain embodiments, the busbar power clip is positioned in specific locations along the horizontal open space or anywhere along the length of the server rear depending on design requirements. In certain embodiments, the specific locations include respective attachment portions 1140 to secure the busbar clip to the specific location. In certain embodiments, the busbar power clip is positioned in one of two specific locations defined by a standard for data center rack busbar based power schemes.

Figure 12:
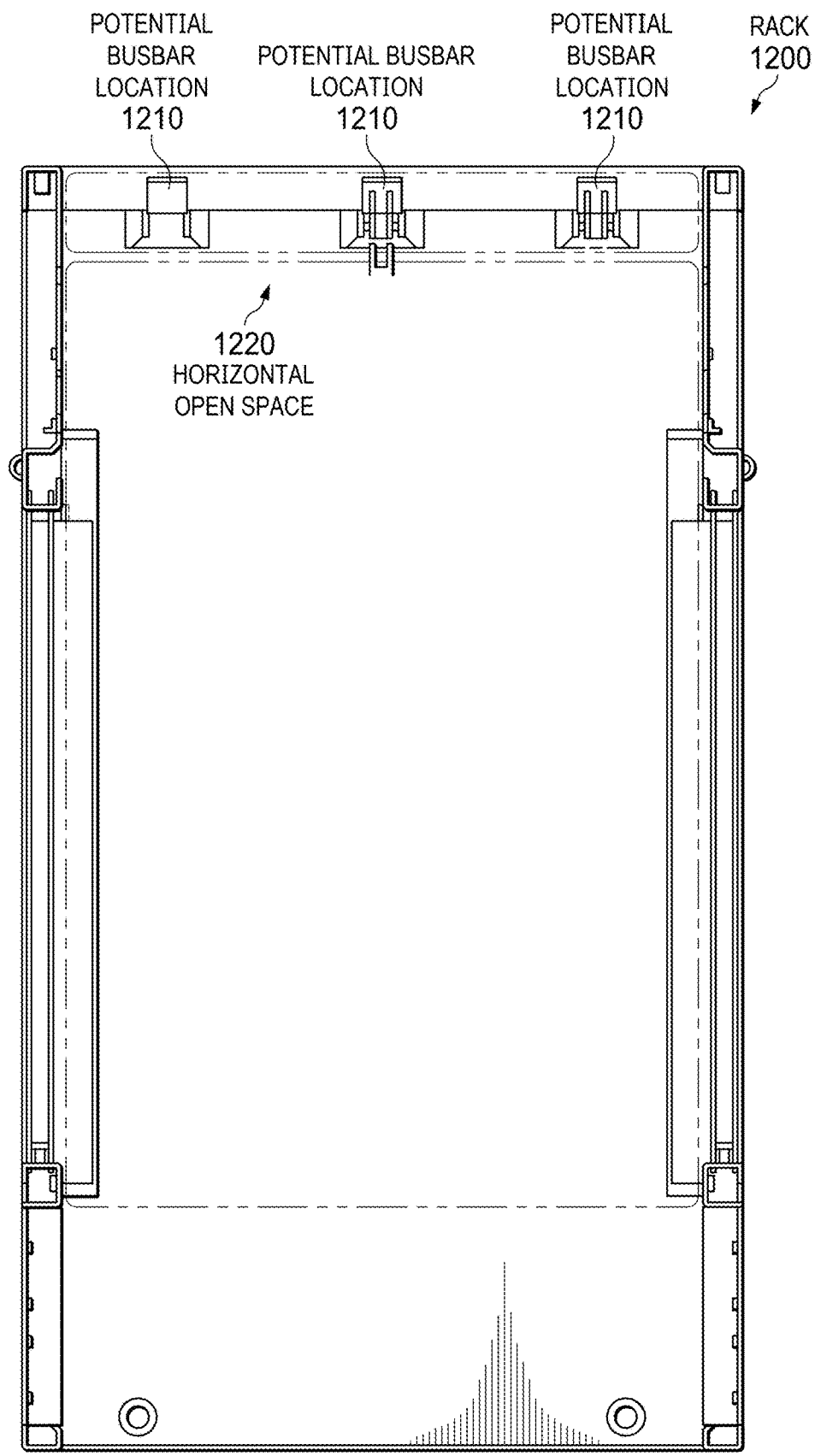
FIG. 12 shows a rear view of a rack with a plurality of potential busbar locations.

FIG. 12 shows a rear view of a rack 1200 with a plurality of potential busbar locations 1210. In certain embodiments, one or more busbar power clips, such as busbar power clip 1010, are positioned in specific locations along the horizontal open space 1220 to interface with one of the plurality of potential busbar locations 1210. In certain embodiments, one or more of the specific locations 1210 are defined by a standard for data center rack busbar based power schemes. In certain embodiments one or more of the specific locations 1210 are defined by a rack standard specification such as the Open Computer Platform Open Rack specification.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A power interface component for a server type information handling system, comprising:
a power adapter structure, the power adapter structure converting a power supply based server type information handling system to function with a rack configured with a busbar power scheme, a portion of the power adapter structure being shaped to fit within a power supply unit bay of the server type information handling system, the power adapter structure comprising a horizontal extension and a rear portion, the horizontal extension being shaped to fit within the power supply unit bay, the rear portion extending perpendicular to the horizontal extension, the rear portion including a rear face, the rear face defining a horizontal open space, a busbar power clip being mounted within the horizontal open space on the rear face via a fastening component, the power clip being configured to be positioned in specific locations along the horizontal open space.

2. The power interface component of claim 1, wherein:
the power adapter structure comprises electronic circuitry, the electronic circuitry converting an input voltage received via the busbar power scheme of the rack to a server-compatible electrical values.

3. The power interface component of claim 2, wherein:
the electronic circuitry comprises an interface for coupling the electronic circuitry of the power adapter structure to a power supply socket of the server type information handling system.

4. The power interface component of claim 1, wherein:
the power adapter structure is a U shaped structure, the U shaped structure fitting across a rear of the server type information handling system and into power supply unit (PSU) bays located along outside edges of the server type information handling system.

5. The power interface component of claim 1, wherein:
the power adapter structure is an L shaped structure, the L shaped structure fitting across a portion of a rear of the server type information handling system and into a power supply unit (PSU) bay located along an outside edge of the server type information handling system.

6. The power interface component of claim 5, wherein:
the power adapter structure comprises a plurality of horizontal extensions, the plurality of horizontal extensions fitting into respective power supply unit bays of the server type information handling system.

7. A server type information handling system comprising:
a processor;
a data bus coupled to the processor;
a server housing, the server housing defining a power supply unit bay; and,
a power interface component, the power interface component comprising a power adapter structure, the power adapter structure converting a power supply based server type information handling system to function with a rack configured with a busbar power scheme, a portion of the power adapter structure being shaped to fit within the power supply unit bay of the server type information handling system, the power adapter structure comprising a horizontal extension and a rear portion, the horizontal extension being shaped to fit within the power supply unit bay, the rear portion extending perpendicular to the horizontal extension, the rear portion including a rear face, the rear face defining a horizontal open space, a busbar power clip being mounted within the horizontal open space on the rear face via a fastening component, the power clip being configured to be positioned in specific locations along the horizontal open space.

8. The system of claim 7, wherein:
the power adapter structure comprises electronic circuitry, the electronic circuitry converting an input voltage received via the busbar power scheme of the rack to a server-compatible electrical values.

9. The system of claim 8, wherein:
the electronic circuitry comprises an interface for coupling the electronic circuitry of the power adapter structure to a power supply socket of the server type information handling system.

10. The system of claim 7, wherein:
the power adapter structure is a U shaped structure, the U shaped structure fitting across a rear of the server type information handling system and into power supply unit (PSU) bays located along outside edges of the server type information handling system.

11. The system of claim 7, wherein:
the power adapter structure is an L shaped structure, the L shaped structure fitting across a portion of a rear of the server type information handling system and into a power supply unit (PSU) bay located along an outside edge of the server type information handling system.

12. The system of claim 7, wherein:
the power adapter structure comprises a plurality of horizontal extensions, the plurality of horizontal extensions fitting into respective power supply unit bays of the server type information handling system.

* * * * *